United States Patent [19]
Hoag et al.

[11] Patent Number: 5,908,272
[45] Date of Patent: Jun. 1, 1999

[54] ROTATIONAL CUTTING TOOL GUARD APPARATUS

[75] Inventors: Donald C. Hoag, Forest; Kevin R. Chapman, Marysville; Angela A. Harmon, Rushsylvania, all of Ohio

[73] Assignee: Honda of America, Mfg., Inc., Marysville, Ohio

[21] Appl. No.: 09/075,077

[22] Filed: May 8, 1998

[51] Int. Cl.[6] .................................................. B23B 39/00
[52] U.S. Cl. ..................... 408/241 G; 408/200; 408/215; 408/710; 470/198
[58] Field of Search ............................... 74/609; 408/119, 408/199, 200, 202, 241 G, 241 R, 215, 222, 710; 470/198

[56] References Cited

U.S. PATENT DOCUMENTS

| | | | |
|---|---|---|---|
| 1,961,604 | 6/1934 | Broemme et al. | 408/119 |
| 2,409,525 | 10/1946 | Andreasson | 408/202 |
| 3,776,647 | 12/1973 | Hart | 408/241 G |

*Primary Examiner*—Daniel W. Howell
*Assistant Examiner*—Monica Smith
*Attorney, Agent, or Firm*—Barbara Joan Haushalter; Alan T. McDonald

[57] ABSTRACT

A guard apparatus for a rotational tool prevents direct contact of the cutting regions by an operator of the tool. The rotational cutting tool to which this invention is particularly applicable is the type having at least a shank portion and a toothed region, with the shank portion attachable to a holding attachment device to hold the tool, particularly during operation. The guard apparatus comprises a compressible guard housing for defining a guard circumferential area following a circular path parallel to but greater than a cutting circumferential area defined by the toothed region of the rotational cutting tool; and a first securement device having a first periphery at a first end for abutting the holding attachment device and a flared and tapered periphery at a second end for associating with the compressible guard housing.

10 Claims, 1 Drawing Sheet

ROTATIONAL CUTTING TOOL GUARD APPARATUS

FIELD OF THE INVENTION

This invention relates generally to cutting tools and particularly to a guard apparatus for providing a safety housing for the toothed or threaded cutting portion of a cutting tool.

BACKGROUND OF THE INVENTION

In industrial and manufacturing applications, the cleaning or rethreading of bores for acceptance of threaded studs or bolts is often needed. For example, when manufacturing personnel have difficulty getting a bolt to start into a weld nut, the threads inside the nut must be cleaned or recut. The rethreading or the cutting of threads in these bores is a laborious task requiring high torque to cut the threads. In many such situations, a tap is used as the thread cutting tool.

A tap is typically made of hardened steel, with very sharp interengaging teeth. The taps are used with pneumatic guns which have an average gun speed of nine thousand three hundred revolutions per minute. In many cases, the tap is being used in an area of tight tolerance, where visual feedback is difficult or impossible. Hence, the operator or assembler must have tactile feedback to confirm that the tap is properly situated. Obviously, when a hand or glove comes into contact with the teeth on the tap, particularly if the teeth portion is rotating, the result can be minor to severe injury to the operator.

It is seen then that there exists a need for a safety feature that can minimize or prevent injury to the operator of a toothed or threaded cutting tool.

SUMMARY OF THE INVENTION

This need is met by the cutting tool guard apparatus according to the present invention, wherein a guard element surrounds the toothed or threaded portion of a cutting tool to minimize and prevent injury to the operator of the tool.

In accordance with one embodiment of the present invention, a guard apparatus is provided for use with a rotational type cutting tool. The rotational cutting tool is comprised of at least a shank portion and a toothed region, with the shank portion attachable to an attachment end to for holding the shank portion and the toothed region, particularly during rotation. The guard apparatus comprises a compressible guard housing for defining a guard circumferential area parallel to but greater than a cutting circumferential area defined by the toothed region of the rotational cutting tool; and a first securement device having a first periphery at a first end for abutting the attachment end and extending in a flared and tapered periphery for associating with the compressible guard housing. The guard apparatus may further comprise a restriction device for holding the first securement device flush against the attachment end. Additionally, the guard apparatus may comprise a second securement device extending from a tip end of the toothed region upward, to secure the compressible guard housing at its opposite end, and to further encourage alignment of the compressible guard housing along its entire length, relative to the cutting tool length.

The present invention provides for several important advantages. For example, the compressible guard housing typically encircles and/or confines at least the cutting regions of the tool, to prevent the tool operator from directly contacting the cutting regions. This is especially desirable during tactile feedback positioning of the cutting regions. The securement device(s) also provides for a number of advantages. It can support the compressible guard housing, secure the compressible guard housing, control rotational and longitudinal movement of the compressible guard housing and prevent the compressible guard housing from disassociating from the cutting tool.

Other objects and advantages of the invention will be apparent from the following description, the accompanying drawings and the appended claims, to which reference may be had for a full understanding of the nature of the present invention.

DESCRIPTION OF THE PREFERRED EMBODIMENT

The present invention provides for a guard apparatus for partially enclosing or confining at least the toothed or threaded portion of a cutting tool, such as a tapping accessory, used in manufacturing and industrial applications. Reference to a tapping accessory is used for illustrative purposes only, and is not to be considered as limiting the scope of the present invention.

Figure 1:
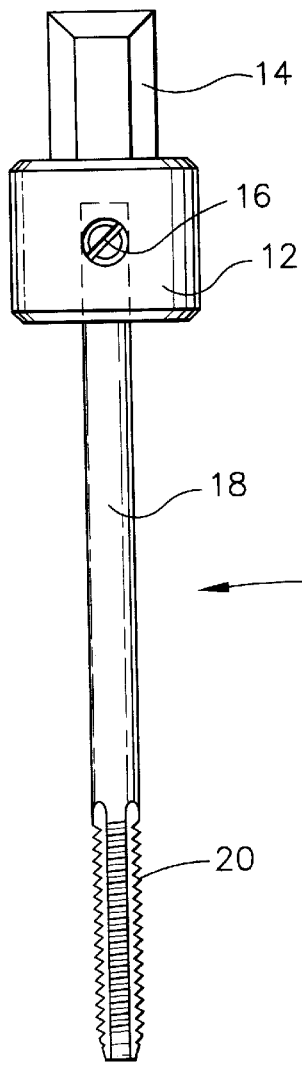
FIG. 1 is a side elevational view of a prior art tapping accessory.

Referring to the drawings, FIG. 1 illustrates an existing tapping accessory 10. The tapping accessory 10 is insertable into a holding means or attachment device 12, typically comprising cylindrical portions such as a chuck, socket, or other attachment means suitable for gripping the tap 10, especially during operation, and culminating in a spindle 14. Suitable means, such as one or more set screws 16, may be used to selectively secure shank 18 of the tap tool 10 to attachment device 12. In addition to the shank 18, the tap tool 10 comprises an interengaging teeth or threaded portion 20 for achieving the cutting or drilling function of the tap accessory 10.

Figure 2:
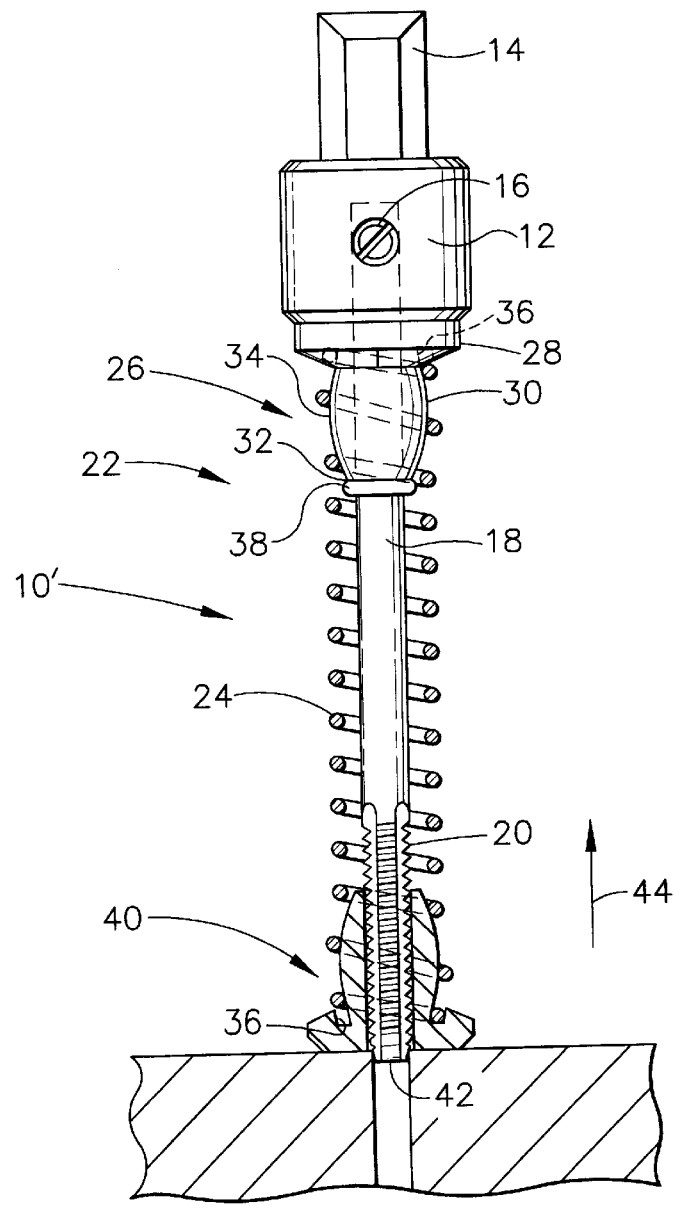
FIG. 2 is a side elevational view, partly in cross section, of the tapping accessory of FIG. 1, illustrating one embodiment of the guard apparatus according to the present invention.

When an operator of the tap accessory 10 uses tactile feedback for guiding the cutting or drilling function during the tap operation, his or her hands necessarily come into contact with the toothed or threaded portion 20 of the tap tool. FIG. 2 illustrates the novel features of the present invention for minimizing or preventing direct contact with the interengaging teeth or threaded portion 20 during tactile guidance of a cutting tool, such as tap accessory 10', by the operator. Specifically, FIG. 2 illustrates a guard apparatus 22 according to the present invention.

In FIG. 2, the guard apparatus 22 comprises an automatic recoil device, such as a compressible guard housing 24, which at least partially confines the cutting tool 10', particularly in the toothed or threaded region 20. The compressible guard housing 24 defines a guard circumferential area having a parallel but greater periphery than that defined by the extension of the interengaging teeth or threaded area 20 and/or the shank 18.

In a preferred embodiment of the present invention, the compressible guard housing 24 contacts a first securement device, such as an abutment or elastomeric device or a bushing 26. The first securement device 26 has a first periphery 28 which abuts the attachment device 12, and a flared and tapering second periphery 30 for associating with the compressible guard housing 24. The compressible guard housing can be secured to the first securement device 26, by smoothly sliding over tapered end 32. The flared section 34 prevents the compressible guard housing 24 from sliding off of the securement device 26. Recessed portion 36 of first securement device 26 further secures the compressible guard housing 24 by snugly clasping an end of the compressible guard housing within the recess 36. Securement device 26, therefore, anchors and secures the compressible guard housing, while still allowing free rotational movement of the first securement device 26 and the compressible guard housing 24 around the tap 10'.

In a preferred embodiment of the present invention, the automatic recoil device 24 comprises a spring. The spring ends may be crimped as an additional safety feature, and to ensure strength of the spring for its safety purpose. The first securement device 26 has rotational movement around the shank 18, but can be prohibited from unrestricted longitudinal movement along the length of tool 10' by a restriction device 38. The spring end contacting the first securement device 26 can be embedded into the securement device, within the recess 36, to secure the compressible guard housing to a free floating structure, giving the compressible guard housing 24 controlled rotational movement with the device 26. The restriction device 38 is preferably situated so as to urge the securement device 26 against attachment end 12, preventing longitudinal movement of device 26. The tight tolerance that might have been required between first securement device 26 and shank 18 can therefore be relaxed. Restriction device 38 further prevents the guard housing 24 and/or bushing 26 from disassociating from the tap accessory 10'. Although it will be obvious to those skilled in the art that first periphery 28 can be of any desired measurement, in a preferred embodiment the first periphery 28 has an outside diameter approximately equal to that of the attachment device 12, for ease of operation. Furthermore, the first securement device may comprise any suitable material or combination of materials, but is preferably an elastomeric or plastic type material, for cost and ease of operation considerations.

In an embodiment where the compressible guard housing is secured to the first securement device 26, the restriction device can have a periphery less than that of the spring 24, and greater than that of the tapered periphery of the device 26. The spring 24 can then extend past the restriction device 38, but the securement device 26 is prevented from moving past the restriction device, thereby preventing the first securement device and the compressible guard housing from disassociating with the tool 10'.

Continuing with FIG. 2, in operation, the operator causes the tap tool 10' to be inserted into a weld nut or other device. The first securement device 26 abuts attachment device 12 and maintains spring 24 in proper alignment with respect to the tap tool 10'. To further improve alignment of the spring 24, a second securement device 40 can be provided at an end of tap tool 10' opposite the end associated with first securement device 26. The second securement device is preferably flush with tip end 42 of the toothed region 20, to further improve positioning of the tap tool 10'. This further prevents the operator from directly contacting the interengaging teeth or threaded portion 20, while still allowing accurate tactile alignment and positioning. Again, the composition of second securement device may be any suitable material, but an elastomeric or plastic material can prevent scratching or other undesirable markings on the item being cut by tool 10'.

Hence, the operator can tactilely position the interengaging teeth portion 20 without having any direct contact with the interengaging teeth of portion 20, because operator only has direct contact with the compressible guard housing 24 and/or securement devices 26 and 40. The compressible guard housing 24 confines the teeth region 20, without restricting the function of the tool 10'.

As the interengaging teeth portion 20 penetrates the interior of the weld nut or other device, the first securement device 26 is held flush against the attachment end 12, and the compressible guard housing 24 is compressed in the direction of arrow 44. The completely compressed guard housing 24 does not extend into an area of the teeth region 20 that is required to penetrate the weld nut or other device. In a preferred embodiment, the bushings 26 and 40 also are not required to actually reach contact in order for the desired cut to occur. Hence, the guard apparatus of the present invention never prevents the teeth region 20 from being properly inserted into the weld nut or other device.

Having described the invention in detail and by reference to the preferred embodiment thereof, it will be apparent that other modifications and variations are possible without departing from the scope of the invention defined in the appended claims.

What is claimed is:

1. A guard apparatus for use with a rotational cutting tool, the rotational cutting tool having at least a shank portion and a toothed region, the shank portion attachable to a holding means for holding the rotational cutting tool during operation, the guard apparatus comprising:

a compressible guard housing for defining a guard circumferential area parallel with but greater than a cutting circumferential area defined by the toothed region of the rotational cutting tool; and a first securement device abutting the holding means for preventing the compressible guard housing from disassociating from the rotational cutting tool.

2. A guard apparatus as claimed in claim 1 further comprising a restriction device for controlling longitudinal movement of the first securement device along a length of the rotational cutting tool.

3. A guard apparatus as claimed in claim 1 wherein the compressible guard housing is secured to the first securement device.

4. A guard apparatus as claimed in claim 3 further comprising a second securement device commencing at a tip end of the toothed region and extending upward along a partial length of the toothed region for securing a second end of the compressible guard housing.

5. A guard apparatus as claimed in claim 4 wherein the compressible guard housing and the first and second securement devices have rotational freedom of movement around a length of the rotational cutting tool.

6. A guard apparatus as claimed in claim 3 wherein the first securement device comprises:

a first periphery for abutting the holding means; and a flared and tapered second periphery for allowing ease of attachment of the compressible guard housing and for ensuring securement of the compressible guard housing.

7. A guard apparatus as claimed in claim 6 wherein the first securement device further comprises a recessed portion in an interior section of the first periphery to clasp the compressible guard housing.

8. A guard apparatus as claimed in claim 4 wherein the second securement device comprises:

a first periphery flush with a tip end of the toothed region; and a flared and tapered second periphery for allowing ease of attachment of the compressible guard housing and for ensuring securement of the compressible guard housing.

9. A guard apparatus as claimed in claim 8 wherein the second securement device further comprises a recessed portion in an interior section of the first periphery to clasp the compressible guard housing.

10. A guard apparatus as claimed in claim 1 wherein the compressible guard housing comprises a spring.

* * * * *